United States Patent [19]

Reis et al.

[11] Patent Number: 5,328,022
[45] Date of Patent: Jul. 12, 1994

[54] EQUIPMENT FOR CONTINUOUSLY MOVING HEAVY LOADS

[76] Inventors: Gianluigi Reis, Via Vettabbia, 6, 20122 Milan; Giorgio Massocco, Salita Sant'Anna, 97, 15033 Casal Monferrato, both of Italy

[21] Appl. No.: 852,168
[22] PCT Filed: Aug. 1, 1991
[86] PCT No.: PCT/IT91/00069
§ 371 Date: Apr. 2, 1992
§ 102(e) Date: Apr. 2, 1992
[87] PCT Pub. No.: WO92/02440
PCT Pub. Date: Feb. 20, 1992

[30] Foreign Application Priority Data
Aug. 2, 1990 [IT] Italy .................................. 311 A/90

[51] Int. Cl.⁵ .............................................. B65G 23/06
[52] U.S. Cl. ...................................... 198/834; 198/845
[58] Field of Search ............... 198/834, 845, 838, 850, 198/851

[56] References Cited

U.S. PATENT DOCUMENTS

| | | | |
|---|---|---|---|
| 1,507,832 | 9/1924 | Henry | 198/853 |
| 2,430,720 | 11/1947 | Kline et al. | 198/834 |
| 3,674,130 | 7/1972 | Carmichael | 198/834 |

FOREIGN PATENT DOCUMENTS 364787 11/1981 Austria .
2045028 3/1971 Fed. Rep. of Germany .

Primary Examiner—Cheryl L. Gastineau
Attorney, Agent, or Firm—Allegretti & Witcoff

[57] ABSTRACT

Equipment for continuously moving heavy loads in a generally horizontal plane comprising a support structure, cog-wheels carried on the support structure and base elements linked to one another by hinges carried on the cog-wheels and defining a chain. Support and moving wheels support the chain and slide on a slide surface. The cog-wheels have external teeth or projections which cooperate with slots in the support and moving wheels. The load carried by the top surface of the base elements is transferred to the support and moving wheels and then to the support structure. The equipment allows for movement of heavy loads in a generally horizontal plane.

4 Claims, 1 Drawing Sheet

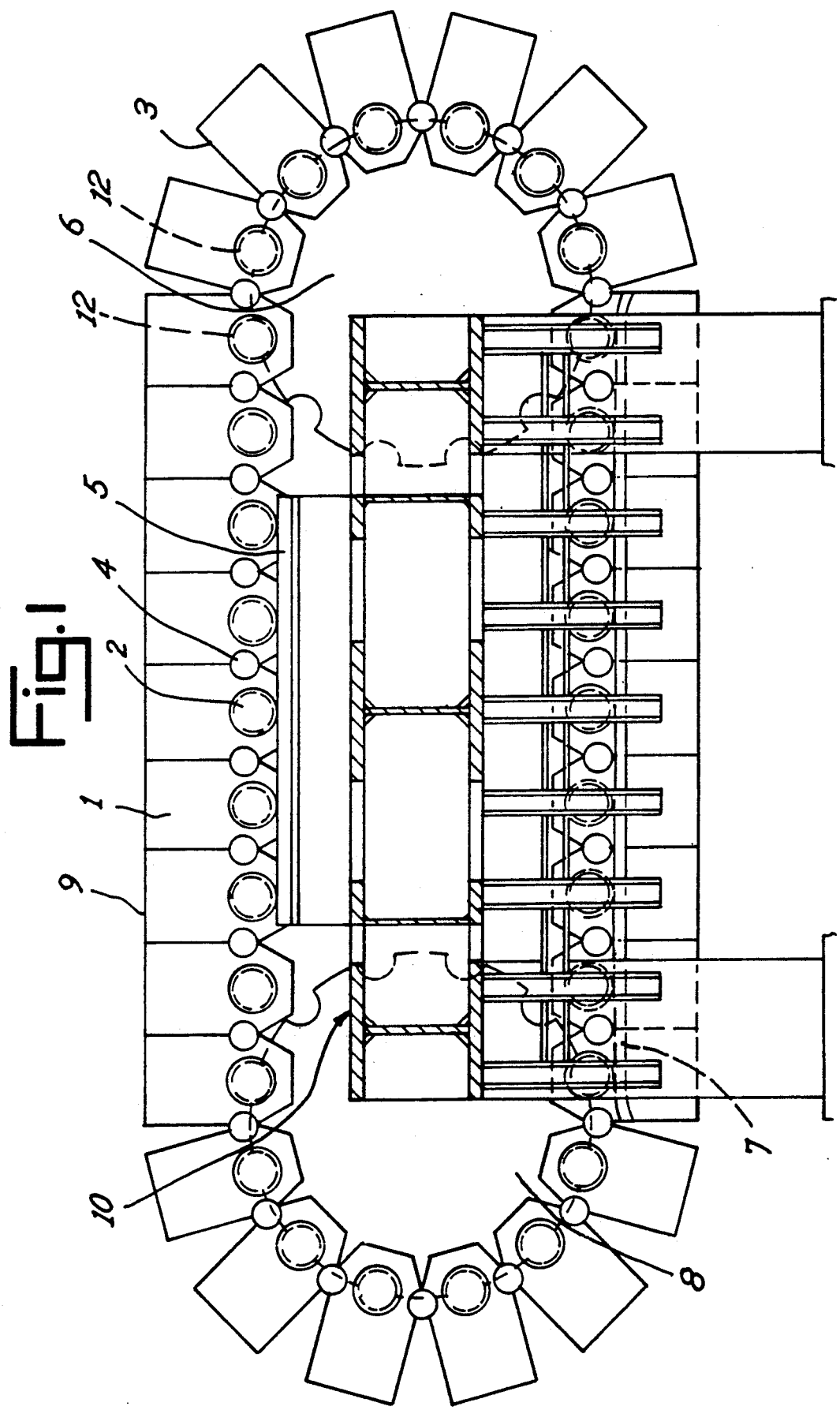

EQUIPMENT FOR CONTINUOUSLY MOVING HEAVY LOADS

BACKGROUND OF THE INVENTION

The present invention refers to equipment which can resolve the problems inherent in moving heavy loads on predetermined lines or routes, above all in environments which are not easily accessible and/or in places where for geometric or other reasons, there is no traditional equipment for moving heavy loads such as roller tracks, cranes, gantry cranes, platforms, etc.

In particular, the equipment in question allows the loading of loads with a specific pressure of up to 100,000 kg/m$^2$ with contained vertical and transversal dimensions and is able to ensure a perfectly level and linear transport since the load is always positioned on the same unitary elements which provide for the movement of the load. This equipment is suited for use in steelworks, quarries, foundries, automatic warehouses with heavy weights, as well as for all those applications which require a high specific pressure such as compactors, etc.

The system described below therefore develops a solution to the problem of continuously moving loads with a specific pressure of up to 100,000 kg/m$^2$ in environments and sites which are not easily accessible and/or which either do not have available or cannot house other means of transport whatever they may be.

BRIEF DESCRIPTION OF THE DRAWING

There is shown in FIG. 1 a presently preferred embodiment of the present invention.

DESCRIPTION OF THE INVENTION

The main components of the equipment, whose description and working is given below, are shown in FIG. 1. More specifically:

the weight, with a specific pressure of up to 100,000 kg/m$^2$, is loaded on the loading plane 9. This plane consists of a series of unitary elements 1, all equal to each other, adjacent to each other and hinged to each other by means of the linking hinge 4 and fitted with moving wheels 2.

The mutual interaction between these elements 1 on the contact surface 3, allows the balance of the unitary element 1 with the load perfectly horizontal on the loading plane 9. The dimensions of the unitary elements 1 are in any case such as to sustain and move the specific loads of up to 100,000 kg/m$^2$.

The linking and moving mechanism, comprising the cog-wheels 6 and 8, as well as the linking hinges 4 for the unitary elements 1 allows, by means of the slotting of the wheels 2 (as indicated by the numeral 12 on several of the wheels) in the spaces of the wheels' teeth 6 and 8, the movement of the unitary elements 1.

The steering system and stress transfer to the equipment's external support structure, constituted by the elements 2-5-7 and the fixed structure 10, guarantees the support of the mobile walls 1-2-4 and the heavy load on the loading plane 9 without notable deformation of the whole structure.

When the entire structure moves, the unitary elements 1, linked to each other by the link hinges 4, are unable to rotate one against the other during straight horizontal movement due to the mutual interaction due to interaction between surfaces 3, while, on the other hand, they are able to rotate, with an opposing direction of rotation and momentary center of rotation which coincides with the axis of the link hinge 4 so as to "open" the loading plane 9 during the rotation of the cog-wheels 6 and 8 in whose opening the wheels 2 of the unitary elements 1 themselves are inserted.

TYPOLOGY OF THE OVERALL UNIT

The equipment is mainly constructed from steel and is installed, in the standard model, in a special metal structure which is robust and reliable, with all the working equipment, alarm and safety devices.

The description above does not indicate in detail the motor mechanisms as well as the auxiliary functional items such as the ways, joints, transmission, etc., since they are considered of no relevance and secondary for the purpose of describing the functioning of the equipment which is the subject of the present invention.

It is obvious that the invention is not limited to the form of execution described and illustrated, but that numerous variations and further improvements can be made without deviating from the basic framework of the invention.

LIST OF THE MAIN COMPONENTS

—1. Base element for the transporter of heavy loads
—2. Running wheel
—3. Balance and contrast surface
—4. Link, dragging and articulation hinge
—5. Horizontal sliding way wheel 2
—6. Traction cog-wheel
—7. Belt return runner
—8. Belt return cog-wheel
—9. Support and longitudinal advance surface for vertical loads
—10. Support structure and stress transfer

We claim:

1. Equipment for the continuous movement of heavy loads comprising a support structure, sliding means on the support structure, a traction cog-wheel having teeth and a return cog-wheel having teeth carried on the support structure, said cog-wheels each being rotatable about a generally horizontal axis, a chain comprising base elements for supporting heavy loads linked to one another by hinges, said base elements having generally vertical interface surfaces, said chain passing over said traction cog-wheel and said return cog-wheel, support structure and moving wheels cooperating with the sliding means and supporting the chain, the support and moving wheels being slotted for receiving the teeth of the traction cog-wheel and the return cog-wheel, the load carried by the base elements being transferred to the support structure and moving wheels by means of the interaction between the adjacent generally vertical interface surfaces of the base elements.

2. Equipment for the continuous movement of heavy loads as in claim 1, wherein the top generally horizontally disposed surfaces of the base elements are disposed in a plane, the support and moving wheels cooperating with the sliding means for transferring the weight of the heavy load to the support structure without notable deformation of the support structure.

3. Equipment for the continuous movement of heavy loads as in claim 2, wherein rotation of the traction cog-wheel will move the chain, with the support and moving wheels engaging the sliding means, and the base elements being linked by said hinges and unable to rotate one against the other during straight horizontal movement due to the mutual interaction between the vertical interface surfaces of the base elements, while being able to rotate when passing over the traction cog-wheel and return cog-wheel, respectively.

4. Equipment for the continuous movement of heavy loads as in claim 3, wherein the base elements during movement over the traction cog-wheel and return cog-wheel are able to rotate with an opposing direction of rotation and the momentary center of rotation coincides with the axis of an associated hinge.

* * * * *